United States Patent
Boyle et al.

(10) Patent No.: US 12,054,202 B2
(45) Date of Patent: Aug. 6, 2024

(54) APPARATUS FOR USE IN TURNING STEERABLE VEHICLE WHEELS

(71) Applicant: TRW AUTOMOTIVE U.S., LLC, Livonia, MI (US)

(72) Inventors: Kevin E. Boyle, Livonia, MI (US); Mark A. Cartwright, Livonia, MI (US); Paul E. Jacobson, Livonia, MI (US); Bruce C. Noah, Livonia, MI (US); Benjamin W. Schoon, Livonia, MI (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 1020 days.

(21) Appl. No.: 16/962,251

(22) PCT Filed: Jan. 18, 2019

(86) PCT No.: PCT/US2019/014309
§ 371 (c)(1),
(2) Date: Jul. 15, 2020

(87) PCT Pub. No.: WO2019/144014
PCT Pub. Date: Jul. 25, 2019

(65) Prior Publication Data
US 2021/0061347 A1    Mar. 4, 2021

Related U.S. Application Data

(60) Provisional application No. 62/618,949, filed on Jan. 18, 2018.

(51) Int. Cl.
*B62D 5/04* (2006.01)
*F16H 1/14* (2006.01)
*F16H 25/22* (2006.01)

(52) U.S. Cl.
CPC ......... *B62D 5/0448* (2013.01); *B62D 5/0424* (2013.01); *B62D 5/046* (2013.01); *F16H 1/14* (2013.01); *F16H 25/2204* (2013.01)

(58) Field of Classification Search
CPC .... B62D 5/0448; B62D 5/0424; B62D 5/046; F16H 1/14; F16H 25/2204
See application file for complete search history.

(56) References Cited

U.S. PATENT DOCUMENTS

| 4,418,781 A | 12/1983 | Rabe et al. |
| 2002/0148672 A1 * | 10/2002 | Tatewaki ............... F16H 55/18 180/443 |

(Continued)

FOREIGN PATENT DOCUMENTS

| CN | 1955055 A | 5/2007 |
| CN | 102712336 A | 10/2012 |

(Continued)

OTHER PUBLICATIONS

English-Chinese Dictionary of Science and Technology, Aug. 31, 2007, pp. 1-4.

(Continued)

*Primary Examiner* — Tony H Winner
(74) *Attorney, Agent, or Firm* — Tarolli, Sundheim, Covell & Tummino LLP

(57) ABSTRACT

An apparatus for use in turning steerable vehicle wheels includes a rotatable shaft that is rotatable relative to the vehicle to effect turning movement of the steerable vehicle wheels. A ball nut assembly is connected with an externally threaded portion of the rotatable shaft. The ball nut assembly moves axially relative to the rotatable shaft upon rotation of the rotatable shaft relative to the ball nut assembly. A steering member is connected to the ball nut assembly and at least one steerable vehicle wheel. The steering member moves with the ball nut assembly relative to the shaft. An (Continued)

electrical motor is connected with the rotatable shaft. The motor is operable to effect rotation of the rotatable shaft relative to the ball nut assembly to turn the steerable vehicle wheels.

18 Claims, 3 Drawing Sheets

(56) References Cited

U.S. PATENT DOCUMENTS

| | | | |
|---|---|---|---|
| 2003/0024760 | A1 | 2/2003 | Ozsoylu et al. |
| 2003/0192734 | A1 | 10/2003 | Bugosh |
| 2003/0221896 | A1 | 12/2003 | Sasaki et al. |
| 2012/0241244 | A1 | 9/2012 | Escobedo et al. |
| 2012/0261208 | A1 | 10/2012 | Rothhamel |
| 2017/0158221 | A1* | 6/2017 | Yamamoto ............. F16H 25/20 |
| 2017/0190351 | A1 | 7/2017 | Kuo et al. |
| 2017/0334479 | A1* | 11/2017 | Asakura ............... B62D 5/0424 |
| 2018/0043927 | A1* | 2/2018 | Asakura ................. F16H 35/18 |
| 2018/0334135 | A1* | 11/2018 | Jung ................... B62D 5/0448 |
| 2020/0398887 | A1* | 12/2020 | Boyle ................. B62D 5/0424 |

FOREIGN PATENT DOCUMENTS

| | | |
|---|---|---|
| CN | 103707922 A | 4/2014 |
| CN | 106853840 A | 6/2017 |

OTHER PUBLICATIONS

Qiche Gouzao, Automobile Structure, 6th Edition (vol. 2), Jun. 30, 2013, pp. 1-11, China Communication Press.

* cited by examiner

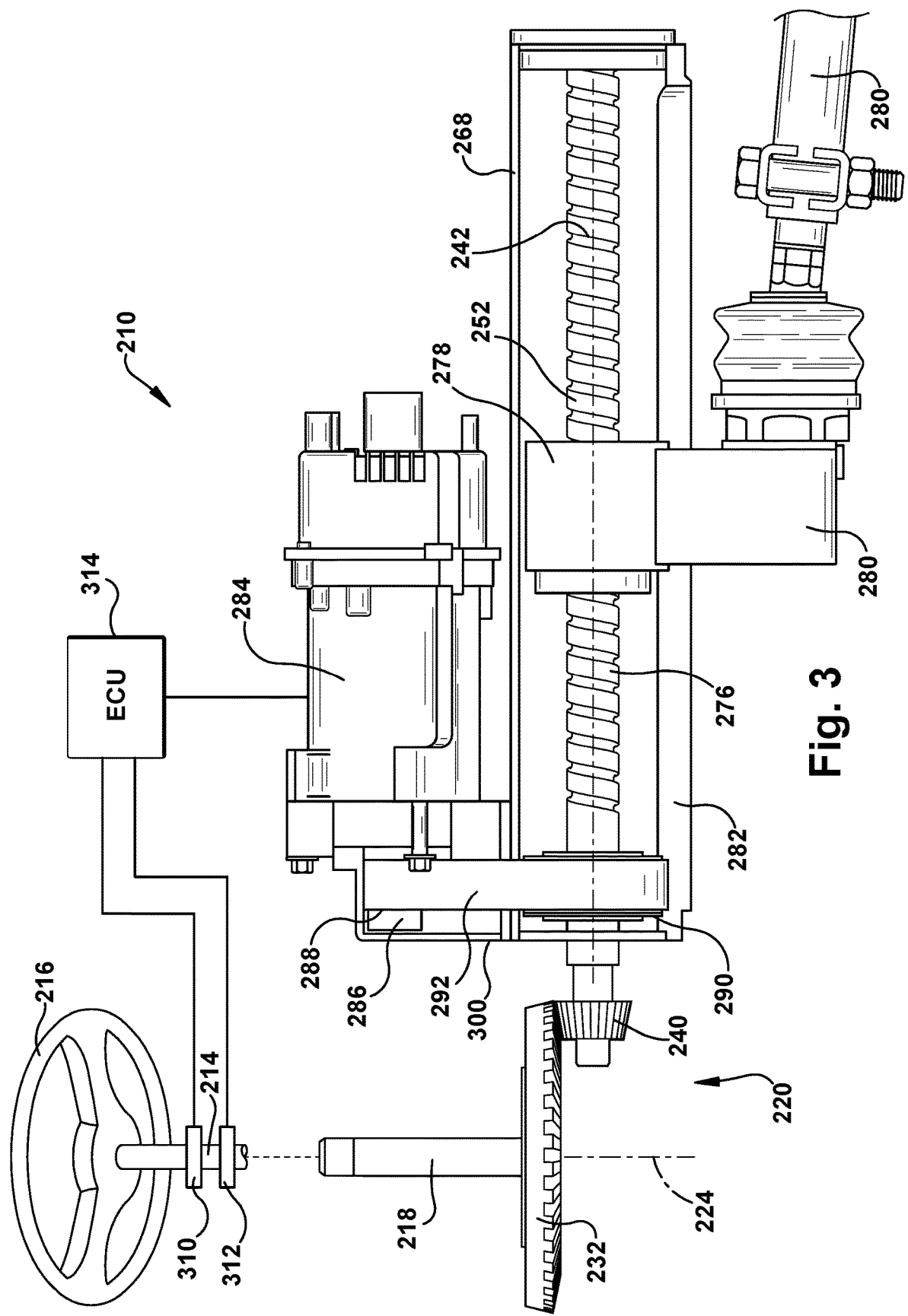

APPARATUS FOR USE IN TURNING STEERABLE VEHICLE WHEELS

RELATED APPLICATION

This application is a national stage of International Application No. PCT/US2019/014309, filed Jan. 18, 2019, the disclosure of which is incorporated herein by reference in its entirety, and which claims priority from U.S. Provisional Application No. 62/618,949, filed Jan. 18, 2018, the subject matter of which is incorporated herein by reference in its entirety.

TECHNICAL FIELD

The present invention relates to an apparatus for use in turning steerable vehicle wheels and, more specifically, to an electric power steering gear for use in turning steerable wheels of a vehicle, especially a commercial vehicle such as a heavy truck.

BACKGROUND OF THE INVENTION

A known vehicle steering apparatus includes a steering member which is axially movable to effect turning movement of steerable vehicle wheels. A pinion is disposed in meshing engagement with a rack portion of the steering member. A steering column interconnects the pinion and a vehicle steering wheel. A ball nut assembly is connected with an externally threaded portion of the steering member. A motor is connected with the ball nut assembly. The motor is operable to effect rotation of the ball nut assembly relative to the steering member to cause the steering member to move axially relative to the vehicle. A steering apparatus having this general construction is disclosed in U.S. Pat. No. 7,055,646.

SUMMARY OF THE INVENTION

An apparatus for use in turning steerable vehicle wheels includes a rotatable shaft that is rotatable relative to the vehicle to effect turning movement of the steerable vehicle wheels. A ball nut assembly is connected with an externally threaded portion of the rotatable shaft. The ball nut assembly moves axially relative to the rotatable shaft upon rotation of the rotatable shaft relative to the ball nut assembly. A steering member is connected to the ball nut assembly and at least one steerable vehicle wheel. The steering member moves with the ball nut assembly relative to the shaft. An electrical motor is connected with the rotatable shaft. The motor is operable to effect rotation of the rotatable shaft relative to the ball nut assembly to turn the steerable vehicle wheels.

BRIEF DESCRIPTION OF THE DRAWINGS

The foregoing and other features of the present invention will become more apparent to those skilled in the art to which the present invention relates upon reading the following description with reference to the accompanying drawings, in which:

FIG. 3 is a schematic illustration of an apparatus for turning steerable vehicle wheels constructed in accordance with a second embodiment of the present invention.

DESCRIPTION

Figure 1:
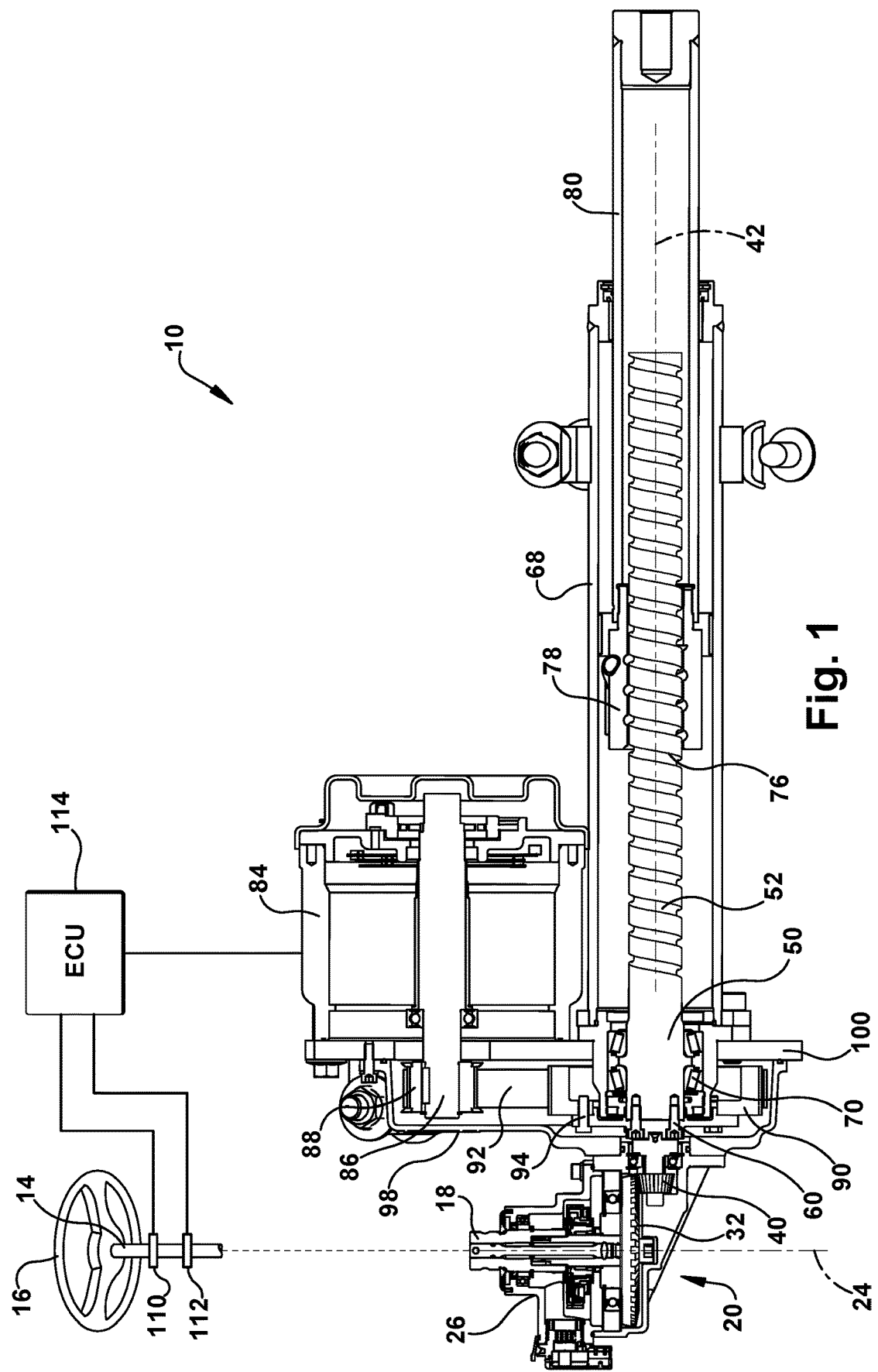
FIG. 1 is schematic illustration of an apparatus for turning steerable vehicle wheels constructed in accordance with a first embodiment of the present invention.
Figure 2:
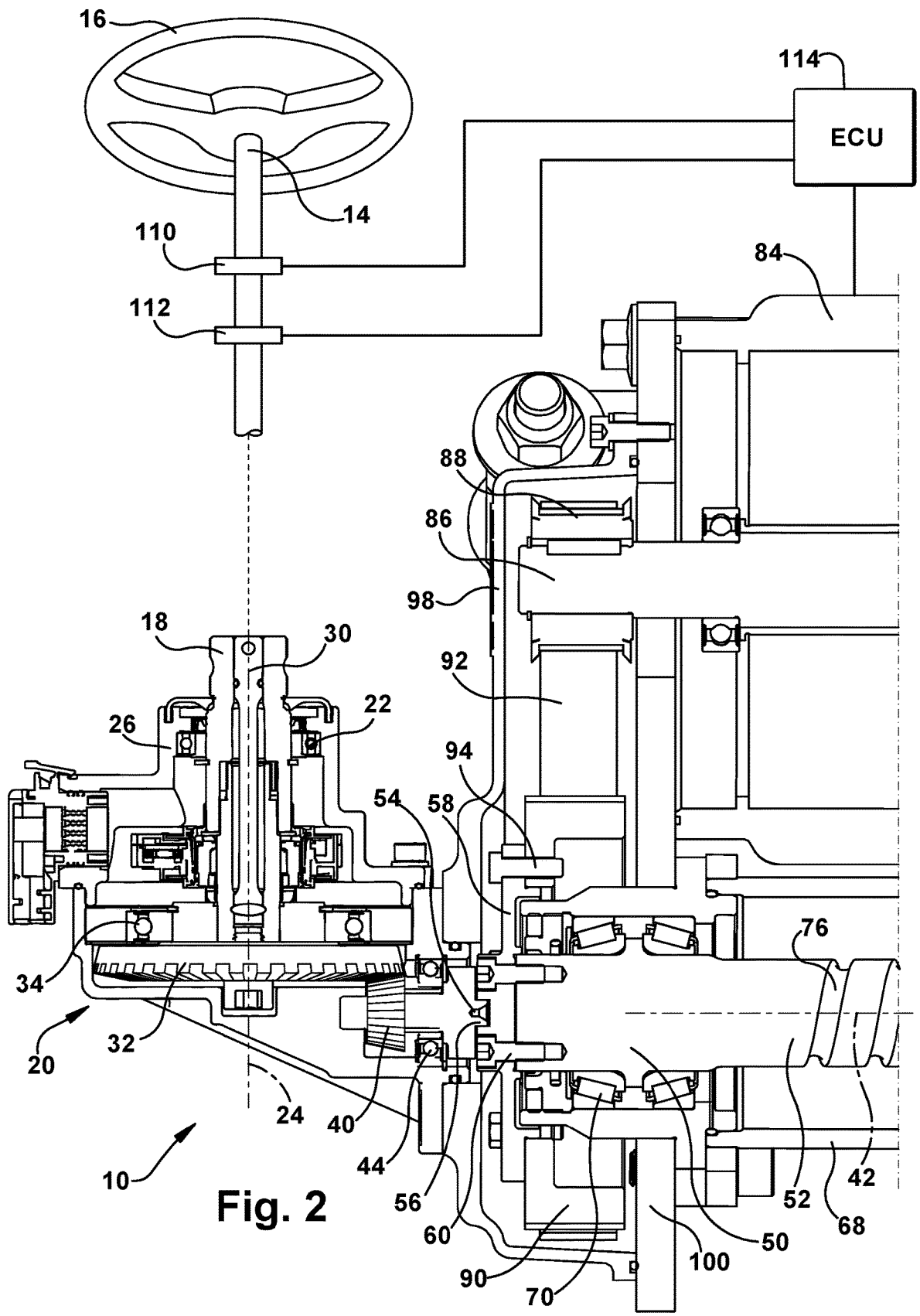
FIG. 2 is an enlarged portion of the apparatus of FIG. 1.

An apparatus 10 for use in turning steerable vehicle wheels constructed in accordance with the present invention is illustrated in FIGS. 1 and 2. The apparatus 10 includes a steering column 14 which is connected to a steering wheel 16. The steering column 14 is also connected to an input shaft 18 of a gear box 20. The input shaft 18 (FIG. 2) is supported by bearings 22 for rotation about an axis 24 of the input shaft relative to a housing 26 of the gear box 20. Upon rotation of the steering wheel 16, force is transmitted through the steering column 14 to the input shaft 18 to cause rotation of the input shaft relative to the housing 26.

The input shaft 18 is connected to a first end of a torsion bar 30. A second end of the torsion bar 30 is connected to a first gear 32. The first gear 32 is supported for rotation about the axis 24 relative to the housing 26 by bearings 34. The torsion bar 30 permits relative rotation between the input shaft 18 and the first gear 32. Although the apparatus 10 is described as including a torsion bar 30 that permits relative rotation between the input shaft 18 and the first gear 32, it is contemplated that the first gear may be directly connected to the input shaft 18. The first gear 32 may be a bevel gear which is rotatable relative to the housing 26 under the influence of force transmitted through the steering column 14 and the input shaft 18.

The first gear 32 may mesh with a second gear 40. The second gear 40 is supported for rotation about an axis 42 relative to the housing 26 by bearings 44. The axis 42 extends transverse to the axis 24 and may extend generally perpendicular to the axis 24. The second gear 40 may be a bevel gear which is rotatable relative to the housing 26 about the axis 42 under the influence of force transmitted through the steering column 14, the input shaft 18 and the first gear 32. The gears 32, 40 may increase the torque applied to the input shaft 18 and the steering column 14.

The second gear 40 may be connected with a first axial end portion 50 of a rotatable shaft 52. The rotatable shaft 52 may extend along the axis 42 and generally perpendicular to the input shaft 18. The second gear 40 may include a projection or key 54 that extends into a slot 56 in a hub 58 connected to the first axial end portion 50 of the shaft 52. The hub 58 is fastened to the first axial end portion 50 of the shaft 52 by fasteners 60. Therefore, the shaft 52 and the hub 58 rotate together with the second gear 40. It is contemplated that the second gear 40 may be connected to the rotatable shaft 52 in any desired manner, such as a splined connection.

The rotatable shaft 52 extends within a tubular housing 68. The shaft 52 is supported for rotation relative to the housing 68 by bearings 70. The bearings 70 support the shaft 52 for rotation about the axis 42. The shaft 52 (FIG. 1) has an externally threaded portion 76 extending within the housing 68. A ball nut assembly 78 extends around the externally threaded portion 76 of the rotatable shaft 52 and is connected to a steering member 80 connected to at least one steerable vehicle wheel.

The rotatable shaft 52 is coaxial with the steering member 80 and may extend into the steering member 80. The ball nut assembly 78 is prevented from rotating relative to the housing 68 and includes a plurality of balls which are disposed in engagement with the externally threaded portion of the rotatable shaft. Rotation of the rotatable shaft 52 relative to the housing 68 and the ball nut assembly 78 is effective to move the ball nut assembly axially relative to the rotatable shaft and axially relative to the housing to axially move the steering member 80. The steering member 80 axially moves relative to the housing 68 and the rotatable shaft 52 with the ball nut assembly 78.

A reversible electric motor 84 is operable to apply a rotational force to the rotatable shaft 52 to urge the shaft to rotate relative to the ball nut assembly 78 and the housing 68. The electric motor 84 (FIG. 2) has an output shaft 86 which is connected to a drive pulley 88. The drive pulley 88 is connected with a driven pulley 90 by a drive belt 92. The driven pulley 90 is connected to the hub 58 by fasteners 94. Therefore, the driven pulley 90 rotates with the shaft 52 relative to the housing 68 and the ball nut assembly 78. The drive belt 92 transmits force to the rotatable shaft 52 to rotate the rotatable shaft about the axis 42 during operation of the motor and rotation of the drive pulley 88.

The electric motor 84 may be connected to the housing 68 with the output shaft 86 extending generally parallel to the rotatable shaft 52. It is contemplated that the gear box 20 may be connected to a cover 98 for the drive belt 92 and pulleys 88, 90. The cover 98 may be connected to a support member or plate 100. The electric motor 84 and housing 68 may be connected to the support member 100. The support member 100 connects the gear box 20, the housing 68 and the motor 84 to the vehicle.

The apparatus 10 (FIG. 1) may include two vehicle condition sensors 110, 112 and an electronic control unit 114 (ECU) for controlling the motor 84 based on sensed vehicle conditions. The vehicle condition sensors 110, 112 may include a torque sensor 110 and a position sensor 112 electrically connected to the ECU 114. The torque sensor 110 may sense the torque applied to the steering wheel 16 and generate a signal indicative of the torque. The position sensor 112 may sense the rotational position of the steering wheel 16 and generate an electrical signal indicative of the steering wheel position. The electrical signals from the torque sensor 110 and the position sensor 112 are sent to the ECU 114. The ECU 114 analyzes the output of the sensors 110, 112 and effects operation of the motor 84 as a function of the output of the sensors. Although the sensors 110 and 112 are shown as being connected to the steering column 14, it is contemplated that the sensors may be connected to the input shaft 18 and/or the first gear 32. It is also contemplated, that only the torque sensor 110 or only the position sensor 112 may be used to effect operation of the motor 84.

In addition, the ECU 114 may have inputs which vary as a function of sensed lateral acceleration of the vehicle (not shown) or other vehicle operating conditions. The ECU 114 receives the signals generated by the sensors and actuates the motor 84 in order to apply an axial force to the steering member 80 to assist in turning of the steerable vehicle wheels.

A second exemplary embodiment of an apparatus 210 for turning steerable vehicle wheels constructed in accordance with the present invention is illustrated in FIG. 3. The apparatus 210 for turning steerable vehicle wheels of FIG. 3 is generally similar to the apparatus 10 for turning steerable vehicle wheels of FIGS. 1-2.

The apparatus 210 includes a steering column 214 which is connected to a steering wheel 216. The steering column 214 is also connected to an input shaft 218 of a gear box 220. The gear box 220 may be substantially similar to the gear box 20 shown in FIG. 1-2. The input shaft 218 is supported by bearings for rotation about an axis 224 of the input shaft relative to a housing (not shown) of the gear box 220. Upon rotation of the steering wheel 216, force is transmitted through the steering column 214 to the input shaft 218 to cause rotation of the input shaft relative to the housing.

The input shaft 218 is connected to a first gear 232 supported for rotation about the axis 224 relative to the housing of the gear box 220. It is contemplated that the input shaft 218 may be connected to the first gear 232 by a torsion bar that permits relative rotation between the input shaft and the first gear. The first gear 232 may be a bevel gear which is rotatable relative to the housing of the gear box 20 under the influence of force transmitted through the steering column 214 and the input shaft 218.

The first gear 232 may mesh with a second gear 240. The second gear 240 is supported for rotation about an axis 242 relative to the housing of the gear box 220. The axis 242 extends transverse to the axis 224 and may extend generally perpendicular to the axis 224. The second gear 240 may be a bevel gear which is rotatable relative to the housing of the gear box 220 about the axis 242 under the influence of force transmitted through the steering column 214, the input shaft 218 and the first gear 232. The gears 232, 240 may increase the torque applied to the steering column 14 and the input shaft 218.

The second gear 240 may be connected with a rotatable shaft 252. The rotatable shaft 252 may extend along the axis 242 and generally perpendicular to the input shaft 218. The second gear 240 may be connected to the rotatable shaft 252 in any desired manner. It is contemplated that the second gear 240 may be connected with the shaft 252 in a manner similar to the connection between the second gear 40 and the shaft 52 of FIGS. 1-2 or with a splined connection.

The rotatable shaft 252 extends within a tubular housing 268. The shaft 252 is supported for rotation relative to the housing 268 by bearings (not shown). The shaft 252 has an externally threaded portion 276 extending within the housing 268. A ball nut assembly 278 extends around the externally threaded portion 276 of the rotatable shaft 252 and is connected to a steering member 280 connected to at least one steerable vehicle wheel.

The ball nut assembly 278 has a radially extending arm 280 that extends through a slot or opening 282 in the housing 268 and is prevented from rotating relative to the housing. The ball nut assembly 278 has a plurality of balls which are disposed in engagement with the externally threaded portion of the rotatable shaft 252, as known in the art. Rotation of the rotatable shaft 252 relative to the ball nut assembly 278 is effective to move the ball nut assembly axially relative to the rotatable shaft and axially relative to the housing 268 to move the steering member 280 and the at least one steerable wheel.

A reversible electric motor 284 is operable to apply a rotational force to the rotatable shaft 252 to urge the shaft to rotate relative to the ball nut assembly 278 and the housing 268. The electric motor 284 has an output shaft 286 which is connected to a drive pulley 288. The drive pulley 288 is connected with a driven pulley 290 by a drive belt 292. The driven pulley 290 is connected to the shaft 252 for rotation with the shaft relative to the housing 268 and the ball nut assembly 278. The drive belt 292 transmits force to the rotatable shaft 252 to rotate the rotatable shaft about the axis 242 during operation of the motor and rotation of the drive pulley 288.

The electric motor 284 may be connected to the housing 268 with the output shaft 286 extending generally parallel to the rotatable shaft 252. It is contemplated that the gear box 220 may be connected to a support member 300 that covers the drive belt 292 and pulleys 288, 290. The electric motor 284 and housing 268 may be connected to the support member 300. The support member 300 connects the gear box 220, the housing 268 and the motor 284 to the vehicle.

The apparatus 210 may include two vehicle condition sensors 310, 312 and an electronic control unit 314 (ECU) for controlling the motor 284 based on sensed vehicle conditions. The vehicle condition sensors 310, 312 may include a torque sensor 310 and a position sensor 312 electrically connected to the ECU 314. The torque sensor 310 may sense the torque applied to the steering wheel 216 and generate a signal indicative of the torque. The position sensor 312 may sense the rotational position of the steering wheel 216 and generate an electrical signal indicative of the steering wheel position. The electrical signals from the torque sensor 310 and the position sensor 312 are sent to the ECU 314. The ECU 314 analyzes the output of the sensors 310, 312 and effects operation of the motor 284 as a function of the output of the sensors. It is also contemplated, that only the torque sensor 310 or only the position sensor 312 may be used to effect operation of the motor 284.

In addition, the ECU 314 may have inputs which vary as a function of sensed lateral acceleration of the vehicle (not shown) or other vehicle operating conditions. The ECU 314 receives the signals generated by the sensors and actuates the motor 284 in order to apply an axial force to the steering member 280 to assist in turning of the steerable vehicle wheels.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in turning steerable vehicle wheels comprising:
    a rotatable shaft that is rotatable relative to a vehicle to effect turning movement of the steerable vehicle wheels;
    a ball nut assembly connected with an externally threaded portion of the rotatable shaft, the ball nut assembly moving linearly along the rotatable shaft upon rotation of the rotatable shaft relative to the ball nut assembly;
    a steering member connected to the ball nut assembly and at least one steerable vehicle wheel, the steering member moving linearly with the linearly moving ball nut assembly relative to the rotatable shaft; and
    an electrical motor connected with the rotatable shaft, the motor being operable to effect rotation of the rotatable shaft relative to the ball nut assembly to turn the steerable vehicle wheels.

2. An apparatus for use in turning steerable vehicle wheels as set forth in claim 1 wherein a first gear rotatable in response to rotation of a steering wheel is disposed in meshing engagement with a second gear connected to the rotatable shaft.

3. An apparatus for use in turning steerable vehicle wheels as set forth in claim 2 wherein the first gear rotates about a first axis and the second gear rotates about a second axis extending transverse to the first axis, the rotatable shaft and the second gear being coaxial.

4. An apparatus for use in turning steerable vehicle wheels as set forth in claim 3 wherein the first and second gears are bevel gears.

5. An apparatus for use in turning steerable vehicle wheels as set forth in claim 3 wherein the first and second gears increase the torque applied to the steering column.

6. An apparatus for use in turning steerable vehicle wheels as set forth in claim 3 wherein a gear box supports said first and second gears for rotation about the first and second axes.

7. An apparatus for use in turning steerable vehicle wheels as set forth in claim 6 wherein the gear box has an input shaft connected to the first gear, the input shaft being connected to a steering wheel and rotatable relative to a housing of the gear box in response to rotation of the steering wheel.

8. An apparatus for use in turning steerable vehicle wheels as set forth in claim 7 wherein a support member connects the gear box, the electric motor and a housing supporting the rotatable shaft.

9. An apparatus for use in turning steerable vehicle wheels as set forth in claim 1 wherein the rotatable shaft and the steering member are coaxial.

10. An apparatus for use in turning steerable vehicle wheels as set forth in claim 9 wherein the rotatable shaft extends into an interior of the steering member.

11. An apparatus for use in turning steerable vehicle wheels as set forth in claim 1 wherein the ball nut assembly has a radially extending portion that extends through an opening in a housing supporting the rotatable shaft for rotation, the radially extending portion being connected to the steering member connected to at least one steerable vehicle wheel.

12. An apparatus for use in turning steerable vehicle wheels as set forth in claim 1 further including at least one vehicle condition sensor and a control unit connected with the at least one vehicle condition sensor, the at least one vehicle condition sensor providing an output to the control unit, the control unit being connected with the motor and being operable to control the operation of the motor as a function of the output from the at least one vehicle condition sensor.

13. An apparatus for use in turning steerable vehicle wheels as set forth in claim 1 further including at least one of a torque sensor for sensing a torque applied to a steering wheel and a position sensor for sensing a position of the steering wheel and a control unit connected with the at least one of the torque sensor and the position sensor, the at least one of the torque sensor and the position sensor providing an output to the control unit, the control unit being connected with the motor and being operable to control an operation of the motor as a function of the output from the at least one of the torque sensor and the position sensor.

14. An apparatus for use in turning steerable vehicle wheels as set forth in claim 1 wherein the linearly moving ball nut assembly applies a linear force to the steering member to move the steering member linearly with the ball nut assembly relative to the rotatable shaft.

15. An apparatus for use in turning steerable vehicle wheels as set forth in claim 1 further including a housing that rotatably supports the rotatable shaft, the ball nut assembly being prevented from rotating relative to the housing.

16. An apparatus for use in turning steerable vehicle wheels as set forth in claim 1 wherein the steering member moves linearly together with the ball nut assembly in a same direction as the ball nut assembly.

17. An apparatus for use in turning steerable vehicle wheels comprising:
    a rotatable shaft that is rotatable relative to a vehicle to effect turning movement of the steerable vehicle wheels;
    a ball nut assembly connected with an externally threaded portion of the rotatable shaft, the ball nut assembly moving axially relative to the rotatable shaft upon rotation of the rotatable shaft relative to the ball nut assembly;

a steering member connected to at least one steerable vehicle wheel, the steering member being directly connected to the ball nut assembly and movable with the ball nut assembly relative to the shaft; and an electrical motor operably connected with the rotatable shaft, the motor effecting rotation of the rotatable shaft relative to the ball nut assembly to turn the steerable vehicle wheels.

18. An apparatus for use in turning steerable vehicle wheels as set forth in claim 17 wherein the ball nut assembly has body and an arm that is integrally formed with the body as a single monolithic piece, the arm extending radially from the through an opening in a housing that rotatably supports the rotatable shaft, the steering member being directly connected to the ball nut assembly at the arm.

* * * * *